United States Patent
Burton

(10) Patent No.: US 10,458,594 B2
(45) Date of Patent: Oct. 29, 2019

(54) ADJUSTABLE HANGER APPARATUS AND METHOD

(71) Applicant: Kenneth William Burton, Los Altos, CA (US)

(72) Inventor: Kenneth William Burton, Los Altos, CA (US)

(*) Notice: Subject to any disclaimer, the term of this patent is extended or adjusted under 35 U.S.C. 154(b) by 0 days.

(21) Appl. No.: 15/664,360

(22) Filed: Jul. 31, 2017

(65) Prior Publication Data

US 2019/0032843 A1 Jan. 31, 2019

(51) Int. Cl.
| | |
|---|---|
| *F16M 13/02* | (2006.01) |
| *F16M 11/04* | (2006.01) |
| *A47G 1/16* | (2006.01) |
| *A47G 1/20* | (2006.01) |
| *A47G 25/10* | (2006.01) |

(52) U.S. Cl.
CPC ............ *F16M 13/02* (2013.01); *A47G 1/164* (2013.01); *A47G 1/202* (2013.01); *A47G 1/205* (2013.01); *A47G 25/10* (2013.01); *F16M 11/046* (2013.01)

(58) Field of Classification Search
CPC ........ A47G 1/164; A47G 1/202; A47G 1/205; A47G 25/10; A47G 1/168; A47G 1/16; A47G 1/20; A47G 1/24; F16M 11/046; F16M 13/02; A47F 5/0006
See application file for complete search history.

(56) References Cited

U.S. PATENT DOCUMENTS

| | | | | |
|---|---|---|---|---|
| 1,720,309 A | * | 7/1929 | Wakefield | A24F 19/0092 224/278 |
| 4,557,455 A | | 12/1985 | Benjamin | |
| 4,661,030 A | * | 4/1987 | Delmastro | B60R 19/24 411/116 |
| 4,694,965 A | * | 9/1987 | Parnell | A47F 5/0846 211/189 |
| 5,360,121 A | * | 11/1994 | Sothman | A47F 5/0846 211/87.01 |
| 6,003,825 A | * | 12/1999 | Abernathy, Jr. | A47G 1/164 248/478 |
| 6,131,864 A | * | 10/2000 | Schumann | A47G 1/175 248/205.3 |

(Continued)

OTHER PUBLICATIONS

How to Hang Level Pictures without a Level, Picture Perfect Hanger®, http://pictureperfecthanger.com/; HANGIT, Novi, MI.(2017).

*Primary Examiner* — Christopher Garft
(74) *Attorney, Agent, or Firm* — Kilyk & Bowersox, P.L.L.C.

(57) ABSTRACT

An adjustable hanger assembly is provided that includes a slider base and a slider that can be adjusted vertically within the slider base and held in a vertical position by an engagement with the slider base. A spring provided in the slider base enables the slider to be maintained in a normally engaged, locked position. By pushing the slider in, toward to the slider base, for example, with a finger or thumb, the slider can be disengaged from the slider base and moved up or down. The assembly can also include a mounting bracket for fixedly securing the assembly to a wall. The mounting bracket can engage the slider base and can be configured to enable the slider base to be adjusted horizontally with respect to the mounting bracket. The hanger assembly can be adjusted both vertically and horizontally after being fixedly secured to a wall.

13 Claims, 13 Drawing Sheets

(56) References Cited

U.S. PATENT DOCUMENTS

| | | | |
|---|---|---|---|
| 6,299,123 B1 | 10/2001 | Hayde | |
| 6,557,813 B1 * | 5/2003 | Duggan | A47G 1/1613 248/476 |
| 6,666,425 B1 * | 12/2003 | Ferguson | A47G 1/202 248/476 |
| 6,827,320 B2 * | 12/2004 | Yeh | A47B 57/565 248/220.22 |
| 7,201,357 B2 | 4/2007 | Price et al. | |
| 7,234,671 B2 | 6/2007 | Avinger | |
| 7,578,492 B2 | 8/2009 | Darre' | |
| 7,677,521 B2 | 3/2010 | Price | |
| 8,376,308 B2 | 2/2013 | Greve' | |
| 9,370,267 B2 | 6/2016 | Greve | |
| 2007/0075211 A1 * | 4/2007 | Potter | A47G 1/202 248/476 |
| 2013/0233992 A1 * | 9/2013 | Darre | A47G 1/164 248/307 |
| 2016/0316942 A1 | 11/2016 | Greve | |

* cited by examiner

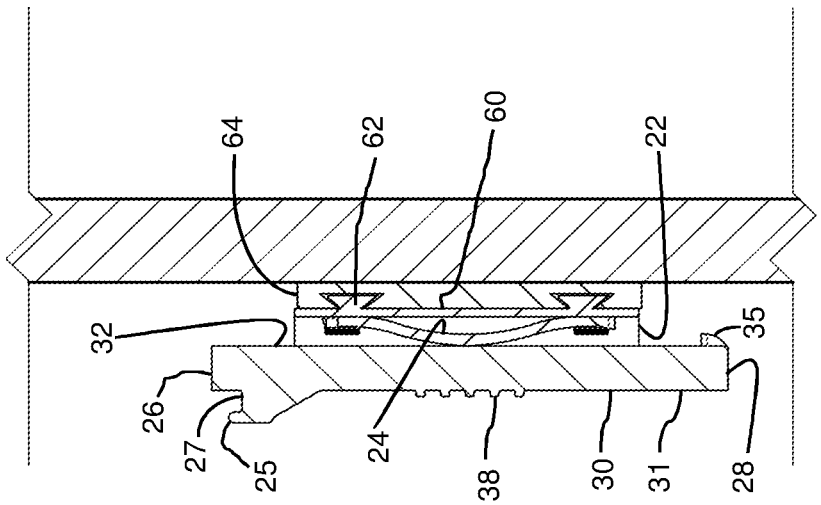
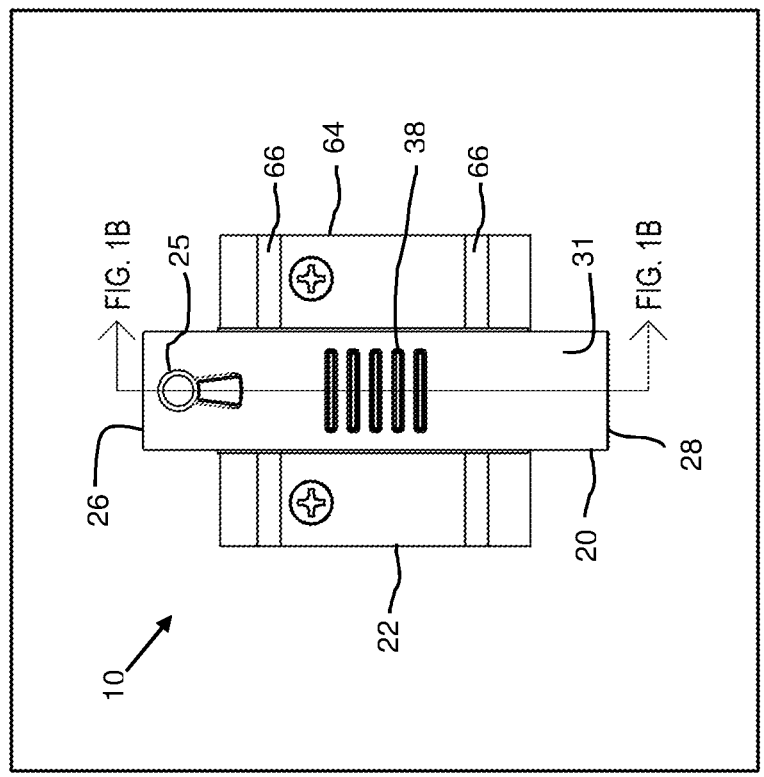

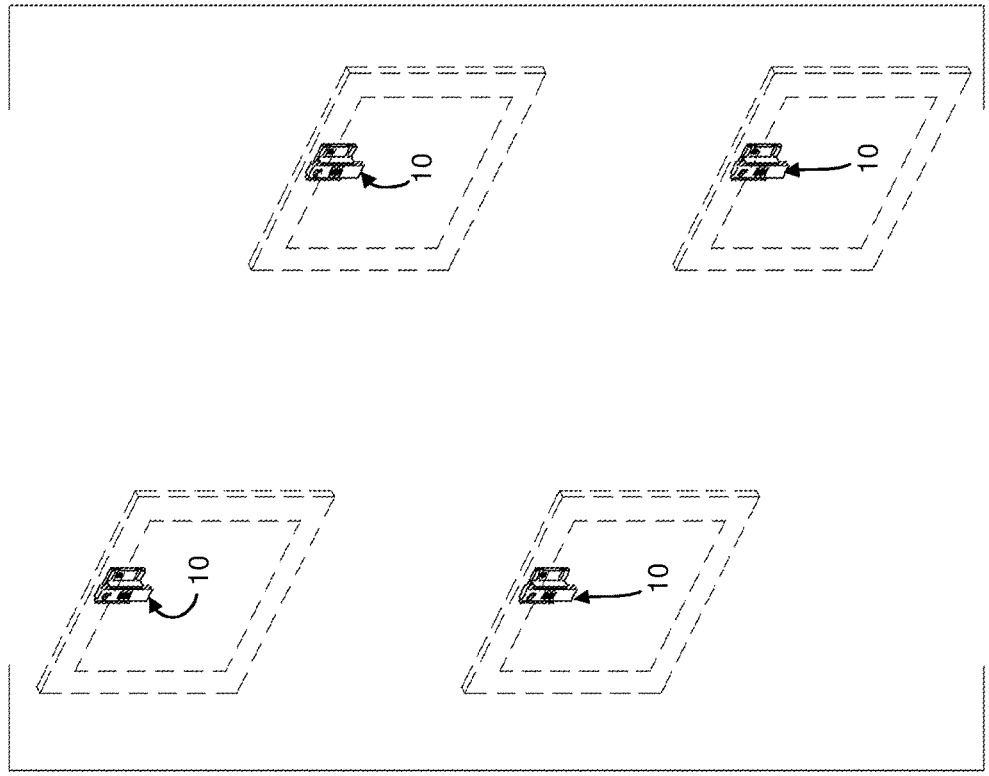
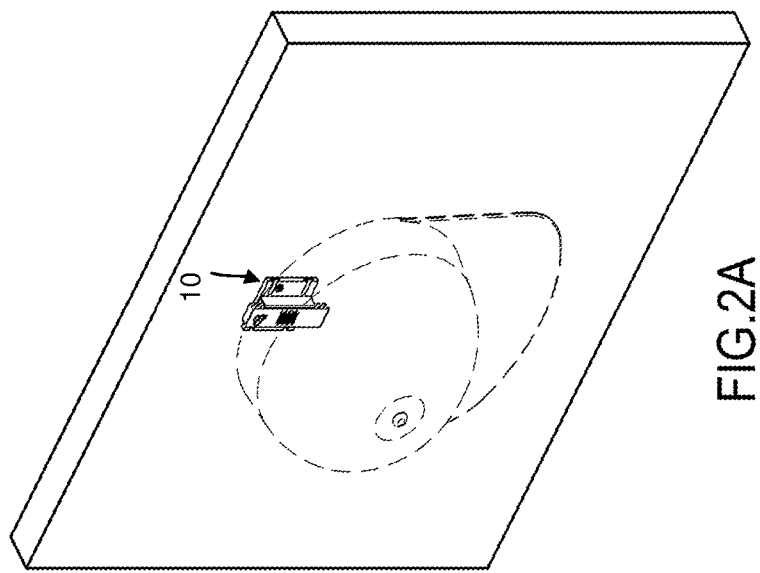
FIG. 2B
FIG. 2A

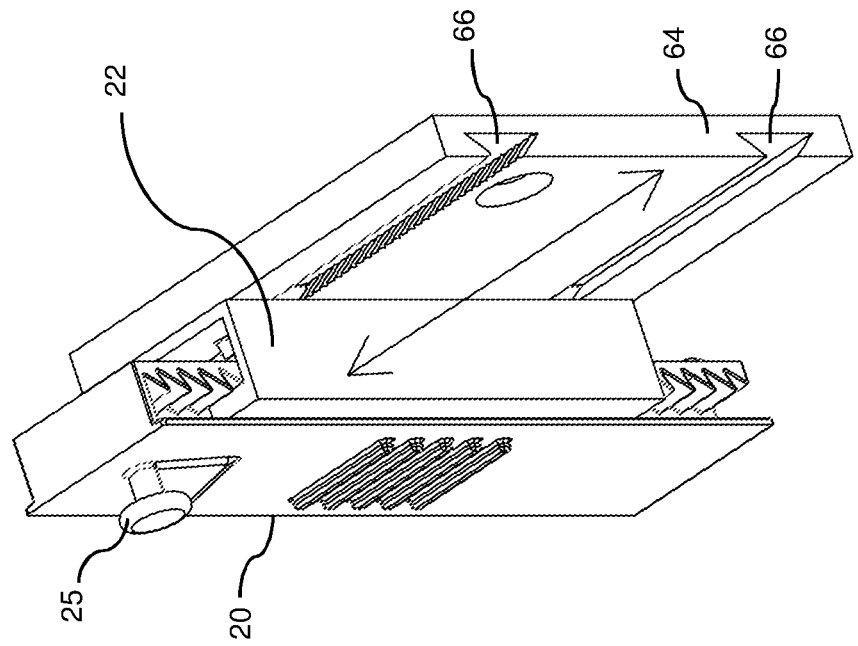
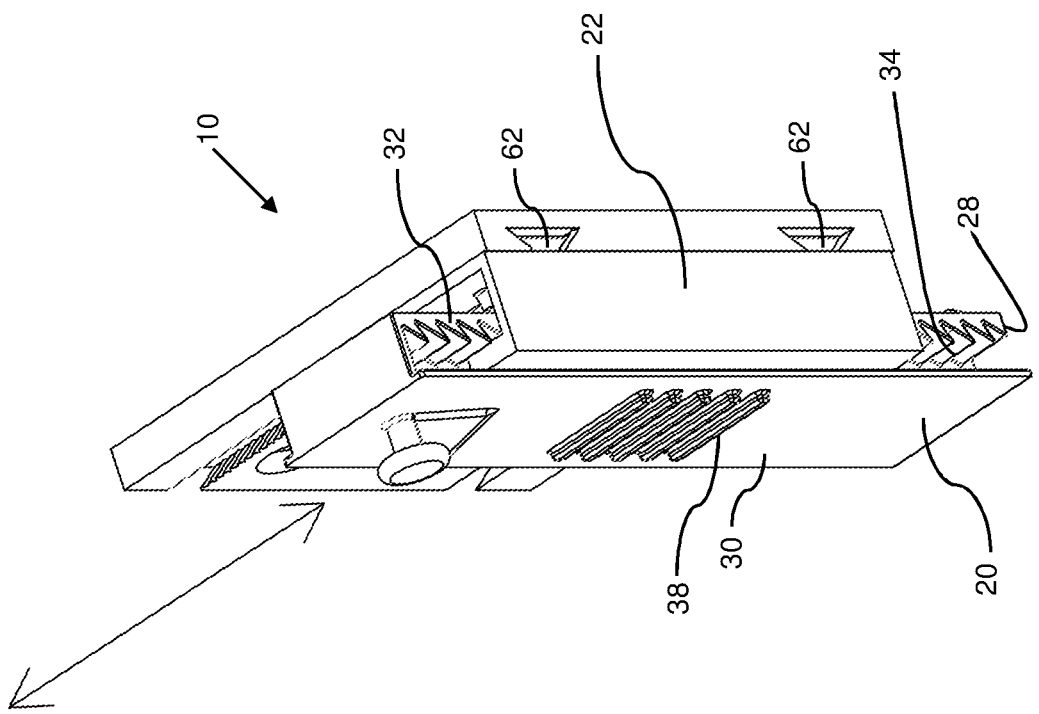

ADJUSTABLE HANGER APPARATUS AND METHOD

FIELD OF THE INVENTION

The present teachings relate to the field of hanger apparatus and methods for placing a frame, such as picture frame, at a selected location on a surface, such as a substantially planar wall. More particularly, the present teachings relate to such hanger apparatus and methods featuring adjustability in one or more axes substantially parallel to such surface, in order to assist with such selected placement.

BACKGROUND OF THE INVENTION

Oftentimes, when it is desired to secure a frame, such as for a picture, at a selected location on a surface, such as a wall, one or more pieces of small-to medium-sized hardware are utilized. In some cases, a common nail can be used, hammered into a wall at a selected location and angled, downwardly, relative thereto such that the distal end of the nail will extend outward and upward once the nail is in place. Slightly more complex than a common nail, various off-the-shelf special-purpose hardware devices are commercially available. Typically, these can comprise something in the nature of a nail or nail-like portion, integral with, or connectable in some manner to, an upward and outwardly extending hook portion. For example, such hardware often can comprise a nail that can pass through a sleeve integral with the hook. The hook can be held against a surface of a wall at a desired height. Conveniently, the hook can be operable to automatically align the nail at an optimum angle. The nail portion, with the accompanying hook portion, can be hammered into a wall, similar to the foregoing nail-only solution. Rather than utilizing the distal end of the nail as a hook, the specific hook portion of the device is used for hanging or attaching the frame at a selected location proximate the surface of the wall. Frames oftentimes include a hanging wire attached to their back sides, which can slip over an installed hook. There are also other known means known that can sit on the nail or hook to support a frame in place. In some instances, for example, one or more holes, channels, keyholes, D-rings, sawtooth hangers, or the like are formed into or on the frame material itself, each of which can fit over or on the distal end of a nail or hook.

Sometimes, with small-to-midsized frames, which usually are not particularly heavy, only a single nail or piece of special-purpose hardware, often referred to as a hanger, is employed. With large to very-large frames, however, which can be heavy and tend to unduly stress just a single nail or special-purpose hanger, plural nails or hangers are often utilized, for example, at spaced-apart locations along the upper margin of the back of the frame, e.g., towards each lateral side of the frame, and sometimes at its central region, as well. Generally, screws can provide more holding power than nails, so they can be preferable for hanging large, heavy pictures. When hanging a frame between studs, a hollow-wall anchor can be used, such as a toggle bolt, molly bolt, or spiral anchor. A spiral anchor is generally considered among the easier of such devices to install, as it can simply be driven into the wall with a screwdriver, and then a screw can be driven into the anchor. Notably, some commercially available spiral anchors include special picture-hanging hooks and some commercially available hangers include an adhesive strip to mount a hook to a wall.

Although not all that complex, several problems are commonly associated with hanging frames in the ways described above. For example, such problems can include one or more of: (i) hanging the frame securely so it doesn't fall; (ii) pinpointing the nail location so the frame hangs with sufficient precision at the desired location; (iii) hanging the frame level with the horizon, with sufficient precision; and (iv) wasting adhesive strips that are placed in the wrong position and need to be removed. Unacceptable errors made with any one or more of the foregoing potential problems can require removal of the problematically placed nail or hanger, and a reattempt. Sometimes multiple rounds are required before satisfactory results are achieved. This can be time-consuming, as well as damaging to the selected surface(s), depending upon the number of repeated attempts required before success is achieved. Further, the task of frame hanging with the above devices and methods can prove to be very frustrating, especially for nonprofessionals, such as homeowners or renters that perform the task only infrequently, for example, as a do-it-yourself (DIY) home-improvement project. Despite the above-mentioned problems, as they have been for countless years, the above-described apparatus and methods of hanging frames continue, to this day, to be the most popular and widely used.

A commercially available product for hanging frames, which is quite different from the above described apparatus and methods, is sold by Designs 4 Life LLC under the registered trademark PICTURE PERFECT HANGER®, marked with U.S. Pat. No. 8,376,308 B2 to Greve', issued Feb. 19, 2013. Such products are available via the internet url: http://pictureperfecthanger.com/.

SUMMARY OF THE INVENTION

The present invention provides an adjustable hanger assembly that includes a slider base and a slider that can be adjusted vertically within the slider base and held in a vertical position by an engagement with the slider base. A spring provided in the slider base enables the slider to be maintained, normally, in an engaged, locked position. By pushing the slider toward the slider base, as with a finger, the slider can be disengaged from the slider base and moved up or down. The assembly can also include a mounting bracket for fixedly securing the assembly to a wall. The mounting bracket can engage the slider base and can be configured to enable the slider base to be adjusted horizontally with respect to the mounting bracket. Accordingly, a hanger assembly is provided that can be adjusted both vertically and horizontally after being fixedly secured to a wall. The slider can include a hanger, for example, at a top end thereof. The hanger can be formed on the slider, and the assembly can be configured, such that the hanger extends above the top of the slider base and above the top of the mounting bracket, such that the assembly can be hidden from view when a frame or most any artwork is hung from the assembly.

The present invention also provides a method that involves mounting a slider base on a wall and then engaging a slider with the slider base, wherein the slider and the slider base as are described herein. The step of mounting the slider base can include first mounting a mounting bracket on a wall and then engaging the slider base with the mounting bracket. Once mounted, the hanger assembly enables adjustment in both vertical and horizontal directions.

These and other objects of the present invention will be more fully understood with reference to the accompanying drawings and the detailed description that follows. The drawings and detailed description are intended to illustrate, not limit, the present invention.

BRIEF DESCRIPTION OF DRAWINGS

The present invention can be even more fully understood with the reference to the accompanying drawings which are intended to illustrate, not limit, the present invention.

FIG. 1A is a front view of an adjustable hanger assembly according to various embodiments of the present invention.

FIG. 1B is a cross-sectional view of the adjustable hanger assembly of FIG. 1A taken along line FIG. 1B-FIG. 1B of FIG. 1A.

FIG. 2A is a top, right-side, perspective view of an adjustable hanger assembly according to the present invention, mounted on a wall and having a baseball cap hung therefrom.

FIG. 2B is a perspective view of a group of four adjustable hanger assemblies, having frames hung therefrom, according to various embodiments of the present invention.

FIGS. 7A and 7B are top, right-side perspective views of an adjustable hanger assembly according to various embodiments of the present invention, and showing horizontal adjustment of the slider base with respect to the mounting bracket.

DETAILED DESCRIPTION OF THE INVENTION

Figure 1D:
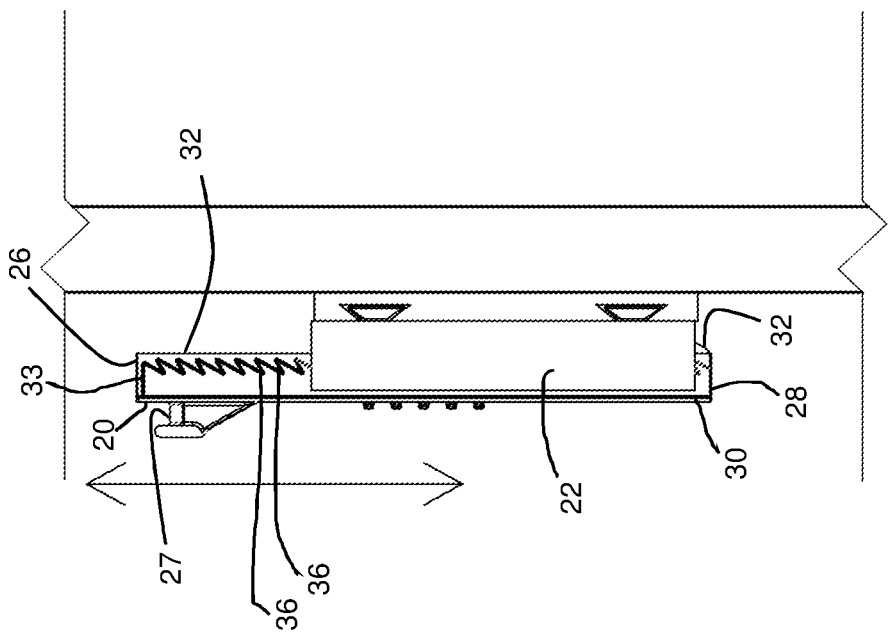
FIG. 1D is a right-side view of the adjustable hanger assembly shown in FIGS. 1A-1C, in a disengaged state whereby vertical adjustment is possible.
Figure 1C:
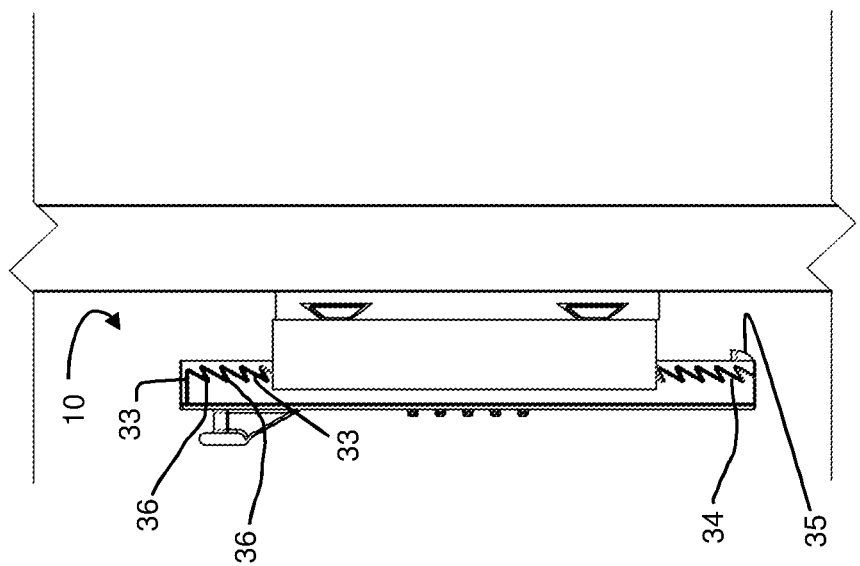
FIG. 1C is a right-side view of the adjustable hanger assembly shown in FIGS. 1A and 1B.

According to various embodiments, the present invention provides an adjustable hanger assembly. The assembly includes a slider, a slider base, and a spring. The slider comprises a top end, a bottom end, a front wall extending from the top end to the bottom end, and a back wall extending from the top end to the bottom end. A plurality of teeth, for example, from about ten to about 20, are provided protruding from the back wall toward the front wall. Each of the teeth extends downwardly at an angle and terminates in a distal edge. The teeth are arranged adjacent to one another such that the distal edges of the teeth are parallel to one another. The slider base comprises one or more fasteners for securing the spring. The slider base has a top end, a bottom end, a groove for slidingly engaging the slider, a base front wall at least partially defining the groove, and at least one catch tooth protruding from the base front wall into the groove. The catch tooth is angled upwardly toward the base top end terminating in a distal catch end. The catch tooth forms a catch groove between the distal catch end and the base front wall. The spring is fastened to the slider base by the fasteners. In some embodiments, the slider base can comprise a plurality of catch teeth and the slider can comprise just one tooth or more. The slider, slider base, or both, can be provided with tabs or locking tabs to prevent the slider from being extended too high or too low with respect to the slider base.

In operation, the slider is slidingly engaged in the slider base. The spring is configured to urge the plurality of teeth of the slider into engagement with the at least one catch tooth. The slider is configured to be biased by the spring. The slider is configured to be pushed against the spring to deform the spring, in the groove, and to enable the slider to move up and down in the groove while the plurality of the teeth of the slider are disengaged from the at least one catch tooth. Different teeth of the plurality of teeth can engage the at least one catch tooth and thus the height of the slider can be adjusted with respect to the slider base. Alternative configurations are also within the realm of the present invention and include such differences as having a plurality of catch teeth and only a single tooth on the slider. The relative height, when mounted on a wall, of the slider with respect to the slider base, can therefore be adjusted.

According to various embodiments of the present invention, the slider base can have a back wall and the back wall can have an inner surface and an outer surface. The inner surface can partially define the groove of the slider base. The outer surface can comprise one or more horizontal rails extending therefrom. The adjustable hanger assembly can also comprise a mounting bracket configured to be fixedly secured to a wall and comprising one or more horizontal receiving grooves for receiving the one or more horizontal rails. With such an arrangement, the slider and slider base can be adjusted horizontally, with respect to the mounting bracket. The horizontal rails can have a cross-section and the horizontal receiving grooves can have a corresponding cross-section that is complementary to and configured to receive the horizontal rails. The horizontal rails can have a substantial circular cross-section, an inverted triangular cross-section, an inverted trapezoidal cross-section, or the like. The slider front wall can include a hanger formed on the outer surface. The hanger can be in the form of a post, a pivotable post, a pin, a knob, a hook, a double hook, combinations thereof, or the like.

The hanger can be in the form of an at least partially round protrusion extending from the slider front wall. The round protrusion can have a shoulder, for example, at a distal end thereof. Between the shoulder and the slider front wall a hanger groove can be defined, for example, between the shoulder of the hanger and the front wall of the slider. In some embodiments, the hanger assembly can further comprise a hook plate. The hook plate can comprise an outer surface, an inner surface, a top end, a bottom end, and a hook mounted or otherwise secured or formed as part of the outer surface. The bottom end of the hook plate can include a clip, for example, to engage a recess in the slider. The inner surface of the hook plate can include a recess for accommodating a hanger, if a hanger exists on the slider. The inner surface of the hook plate can include one or more additional recesses, for example, a recess to accommodate a plurality of gripping ridges formed on the outer surface of the slider. In some embodiments, the slider can be flat on a front surface thereof, such that it does not include a hanger, and the inner surface of the hook plate can therefore be flat and need not include a recess for accommodating a hanger.

With reference now to the drawings, FIGS. 1A-7B shows an adjustable hanger assembly 10 according to various embodiments of the present invention. Assembly 10 includes a slider 20, a slider base 22, and a spring 24. Each of the components can comprise a metal material, a plastic material, or the like. Slider 20 includes a top end 26, a bottom end 28, a front wall 30 extending from top end 26 to bottom end 28, a back wall 32 extending from top end 26 to bottom end 28, and a plurality of teeth 34. The number of teeth can be any suitable amount, for example, one tooth, two teeth, three teeth, four teeth, five teeth, or more. The slider can have ten teeth or more. Each of teeth 34 protrudes from back wall 32 toward front wall 30 and extends downwardly at an angle. The angle can be one degree or more, five degrees or more, ten degrees or more, 89 degrees or less, 75 degrees or less, or within any suitable range, for example, from about 15 degrees to about 75 degrees, from about 30 degrees to about 60 degrees, or from about 40 degrees to about 50 degrees. The angle can be about or exactly 45 degrees. Each tooth 34 terminates in a distal edge 36. The plurality of teeth 34 can be arranged adjacent one another such that distal edges 36 are parallel to one another or otherwise have the same or a similar profile or edge shape.

Slider base 22 can include one or more fasteners 40 for securing spring 24 to slider base 22. The fasteners can be or comprise bridges, arches, loops, punch-outs, slots, adhesive pads, a threaded connection, combinations thereof, and the like. Slider base 22 can have a base top end 42, a base bottom end 44, a groove 46 for slidingly engaging slider 20, a base front wall 48 at least partially defining groove 46, and at least one catch tooth 50 protruding from base front wall 48 into groove 46. Catch tooth 50 can be angled upwardly toward base top end 42, terminating in a distal catch end 52 forming a catch groove 54 between distal catch end 52 and base front wall 48. In some embodiments, slider 20 can have one or teeth and slider base 22 can have a plurality of catch teeth. Spring 24 can be fastened to slider base 22 by fasteners 4 as shown in FIG. 5A.

The different components of assembly 10 can be provided together as a kit, for example, disassembled. In use slider 20 is slidingly engaged in groove 46 of slider base 22. Spring 24 is configured to urge the plurality of teeth 34 of slider 20 into engagement with catch tooth 50. Slider 20 can be configured to be biased by spring 24 and spring 24 can be formed of any suitable shape to provide such a biasing effect, for example, spring 24 can comprise a leaf spring. Slider 20 can be configured, along with groove 46, so that slider 20 is urged against spring 24. Spring 24 can thus be slightly deformed, for example, even when one or more of teeth 34 are engaged with catch tooth 50. To adjust the slider position relative to the slider base, the slider can be pushed toward the slider base, against the spring, to disengage the plurality of teeth 34 from catch tooth 50, then while maintaining the disengaged relation, slider 20 can be slid up or down within grove 46 of slider base 22. Once the applied pressure for urging slider 20 toward slider base 22 is released, the plurality of teeth 34 are then biased into engagement with catch tooth 50 and downward movement of slider 20 with respect to the slider base 22 is prevented. When slider base 22 is mounted to a wall, or engaged with a mounting bracket mounted on a wall, the relative height of the adjustable hanger assembly can be vertically adjusted. Vertical adjustment can be made with a single finger or thumb, without the need for tools. The spring only needs to provide very little biasing force as gravity also forces the slider teeth into engagement with the catch teeth. There is little if no need to press the slider in while moving the slide upwardly as a ratcheting effect occurs when slid upwardly and the teeth of the slider are not acting against the catch teeth. The assembly is free of, that is, does not include a structure interfering with up and down translation when the slider is depressed. Within the groove or channel formed in the slider base, the spring provides a floating effect against any structural interference. The spring can be provided separately and then installed in the slider base, or pre-connected to the slider base, for example, inserted into slots, riveted, welded, integrally-molded, or otherwise formed with, or as part of, the slider base. The spring can comprise a metal material, a plastic material, or the like. Other spring types such as coiled springs can be used. Deformable foams and plastics can be used, for example, elastically deformable closed-cell foams.

According to various embodiments, slider base 22 can have a base back wall 56 having an inner surface 58 and an outer surface 60. Inner surface 58 can define or partially define groove 46. Outer surface 60 can comprise one or more horizontal rails 62 extending therefrom. Adjustable hanger assembly 10 can further comprise a mounting bracket 64 configured to be fixedly secured to a wall, for example, by adhesive, pressure sensitive adhesive, double-sided tape, a hook and loop fastener combination, screws, screw and anchor combinations, spiral anchors, bolts, molly bolts, nails, or the like. Mounting bracket 64 can comprise one or more horizontal receiving grooves 66 for receiving horizontal rails 62 of slider base 22. Horizontal receiving grooves 66 can be of a cross-sectional shape configured to accommodate and receive horizontal rails 62, for example, of a complimentary shape. Each of horizontal rails 62 can have the same or different cross-sectional shape as one or more other horizontal rails 62. Each horizontal rail 62 can have an inverted trapezoidal cross-sectional shape as shown in FIGS. 1B-1E and 5B-7B. Other cross-sectional shapes of horizontal rails 62 and horizontal receiving grooves 66 can be used, for example, round cross-sections, inverted triangular cross-sections, and the like.

According to various embodiments, slider front wall 30 can have an outer surface 31 and a hanger 25 formed on outer surface 31. Hanger 25 can be or comprise a hook, a post, a pivotable post, a knob, combinations thereof, and the like. Hanger 25 can be in the form of an at least partially round protrusion extending from the slider front wall and defining a hanger groove 27.

FIG. 2A illustrates a use for adjustable hanger assembly 10 as a hat hanger. FIG. 2B illustrates the use of four adjustable hanger assemblies for hanging four frames, spaced apart, where fine adjustments in both vertical and horizontal directions might be desired.

Figure 3:
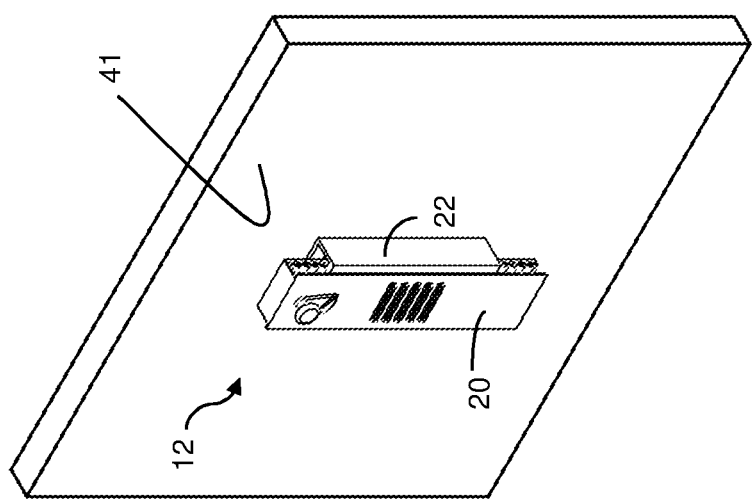
FIG. 3 is a top, right-side, perspective view of an adjustable hanger assembly according to various embodiments of the present invention, which do not include a mounting bracket.

FIG. 3 shows an embodiment of an adjustable hanger assembly 12 that differs from assembly 10 in that no mounting bracket is used with the assembly. In the embodiment shown in FIG. 3, slider base 22 is mounted directly onto a wall 41, for example, by adhesive, pressure sensitive adhesive, double-sided tape, a hook and loop fastener combination, screws, screw and anchor combinations, spiral anchors, bolts, molly bolts, nails, or the like.

Figure 4:
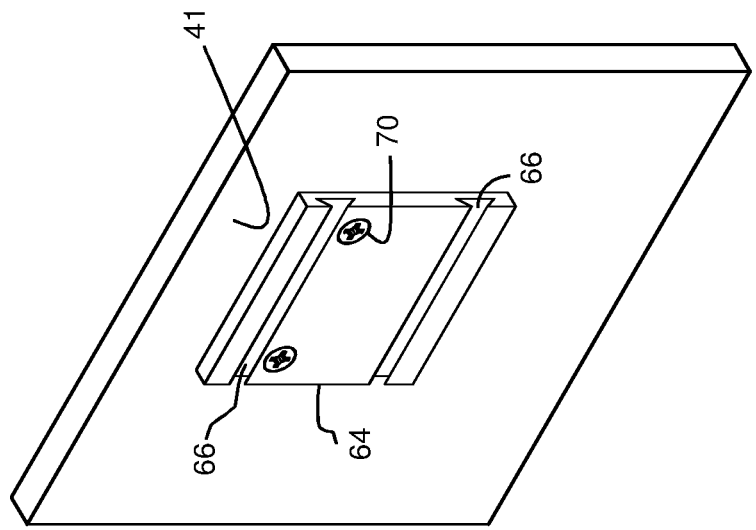
FIG. 4 is a top, right-side, perspective view of a mounting bracket according to various embodiments of the present invention.

FIG. 4 shows mounting bracket 64, alone, mounted on a wall 41 by two screws 70. The beveled opening of the screw through-holes and beveled nature of the screw heads enable the screws to be set such that they are flush with the facing surface of mounting bracket 64. Horizontal receiving grooves 66 are shown having inverted trapezoidal cross-sections.

Figure 5B:
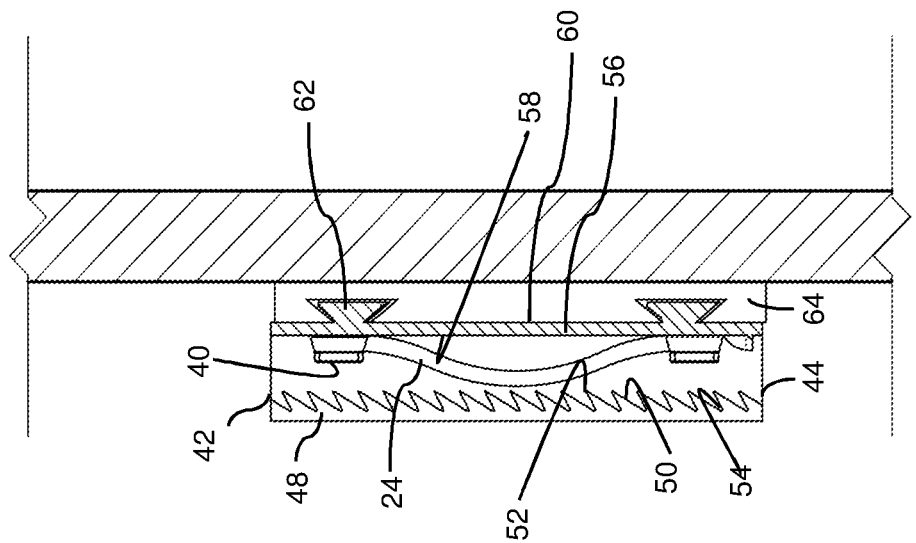
FIG. 5B is a right-side, side view of the cutaway slider base shown in FIG. 5A, with a mounting bracket added.
Figure 5A:
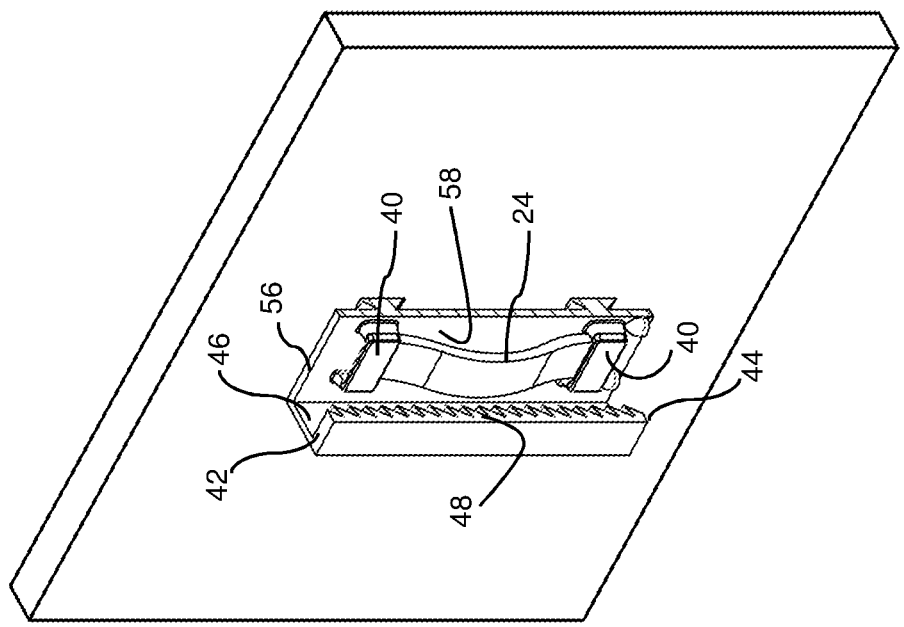
FIG. 5A is a top, right-side, perspective view, in partial cutaway, of a slider base in accordance with various embodiments of the present invention.

FIGS. 5A and 5B show slider base 22 in greater detail. Fasteners 40 are shown in the form of bridges, spring 24 is shown as a leaf spring, and the opposing ends of leaf spring 24 are tucked under the respective bridges to fasten leaf spring 24 to slider base 22. In FIG. 5A mounting bracket 64 has been omitted but mounting bracket 64 is shown in FIG. 5B as is the complimentary, inverted trapezoidal, relationship between horizontal rails 62 and horizontal receiving grooves 66.

Figure 1E:
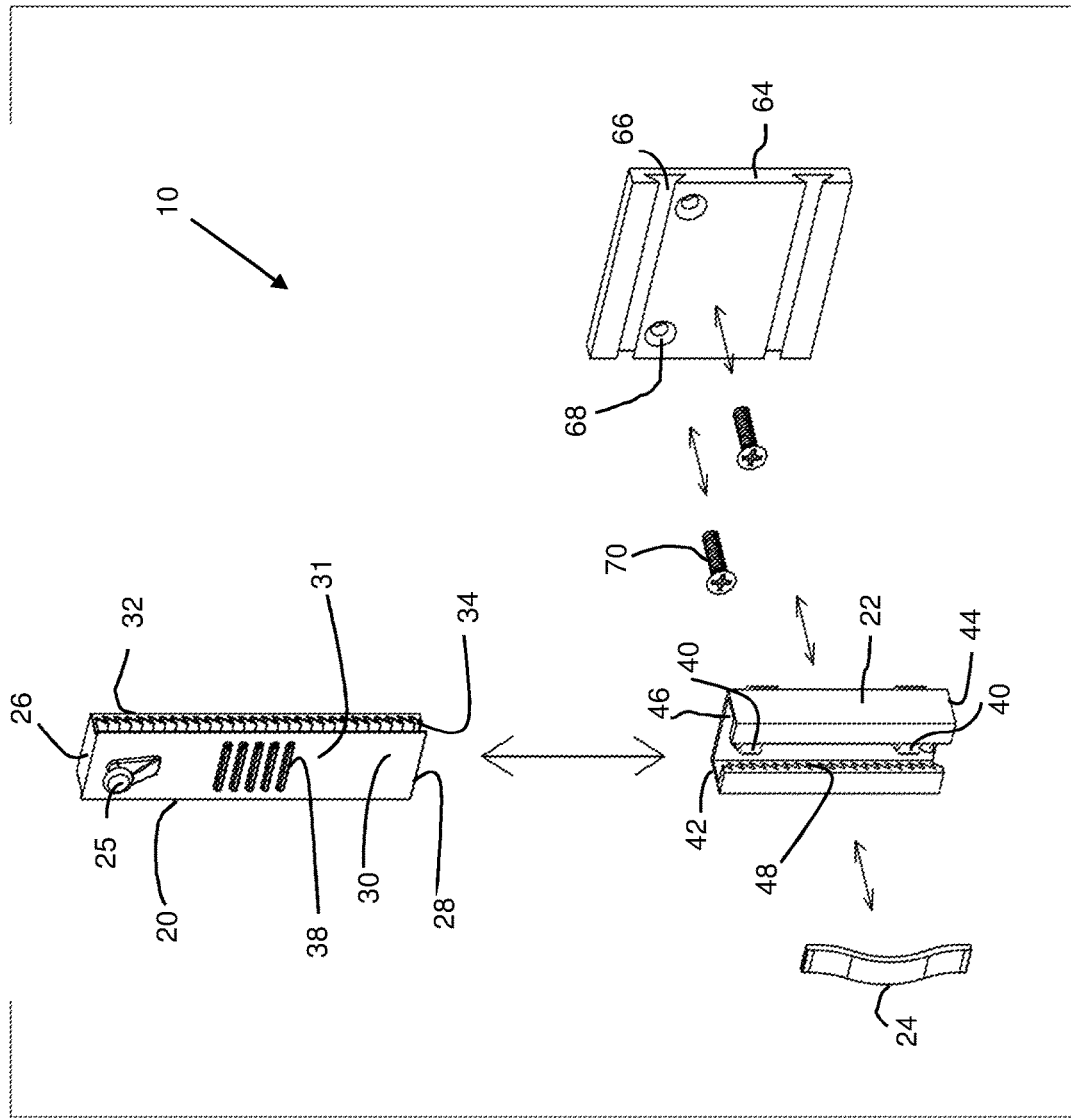
FIG. 1E is a top, right-side, perspective, exploded view of the adjustable hanger assembly shown in FIGS. 1A-1D.
Figure 6:
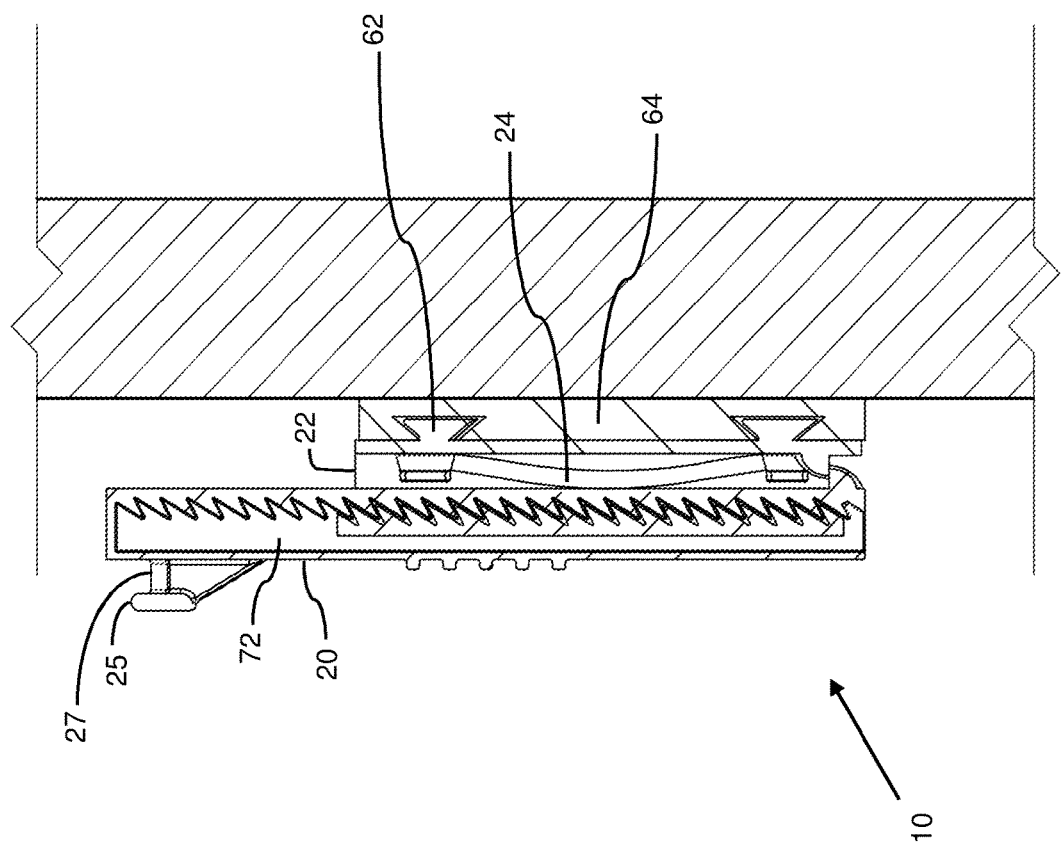
FIG. 6 is a right-side view of an adjustable hanger assembly, in partial cutaway, according to various embodiments of the present invention.

FIG. 6 shows slider 20 engaged in slider base 22, in partial cross-section. With reference also to FIG. 1E, slider 20 can be accommodated in, and captured in, groove 46 of slider base 22, with front wall 30 of slider 20 outside of groove 46 and back wall 32 of slider 20 inside groove 46. Back wall 32 of slider 20 can comprise two columns of teeth, one on the left-hand side and the other on the right-hand side. The two columns of teeth can be separated by a solid center 72 that connects back wall 32 to front wall 30 of slider 20. Solid center 72 of slider 20 can slip the front opening of slider base 22, which opens into groove 46. Front wall 48 of slider base 22 comprises left and right portions separated by a gap that is wide enough to accommodate solid center 72 of slider 20. As such, a design such as a carriage captured on a rail is provided, preventing lateral or horizontal movement of the slider with respect to the slider base. Furthermore, a stop feature 33 is provided at the top of slider 20 (FIGS. 1C-1D), in the form of a top wall, to prevent slider 20 from falling through and out of slider base 22. A catch 35 can also be provided at or near bottom end 28 to prevent slider 20 from being slid out of the top of groove 46 and slider base 22.

FIGS. 7A and 7B show how slider base 22 can be moved horizontally with respect to mounting bracket 64 and illustrates how horizontal rails 62 of slider base 22 move within horizontal receiving grooves 66 of mounting bracket 64. One or both of horizontal rails 62 and horizontal receiving grooves 66 can be provided with notches, ridges, bumps, or other features so that a specific horizontal orientation can be achieved and maintained. Such features are shown in the top horizontal receiving groove 66 shown in FIG. 7B; corresponding complimentary features can be provided on the top horizontal rail 62.

A particular advantage of the present invention is the ability of the hanger to be raised to a height that is above the height of the slider base and above the height of the mounting bracket. The slider base, mounting bracket, or both, can have respective top edges, and the top of the slider, including the top of the hanger, can extend above the top surface of the slider base, mounting bracket, or both. With such a feature, no part of the assembly shows behind a frame or behind many an object hung by the assembly. The extension of the hanger above the slider base top edge and above the mounting bracket top edge can be seen at least in FIGS. 1A-1D, 2A-3, and 6-7B.

Figure 8B:
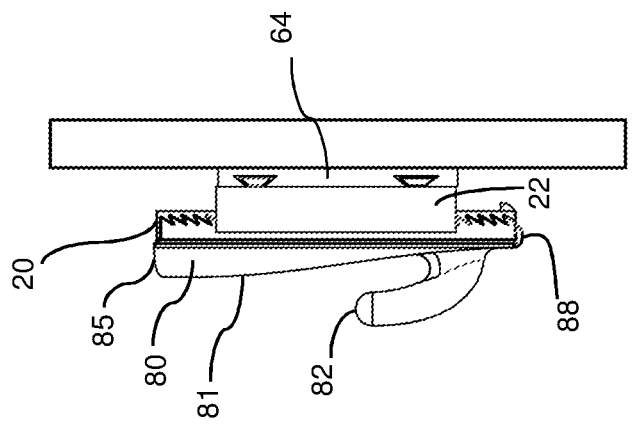
FIGS. 8A-8E depict various views of an adjustable hanger assembly according to various embodiments of the present invention, which include a hook plate.
Figure 8A:
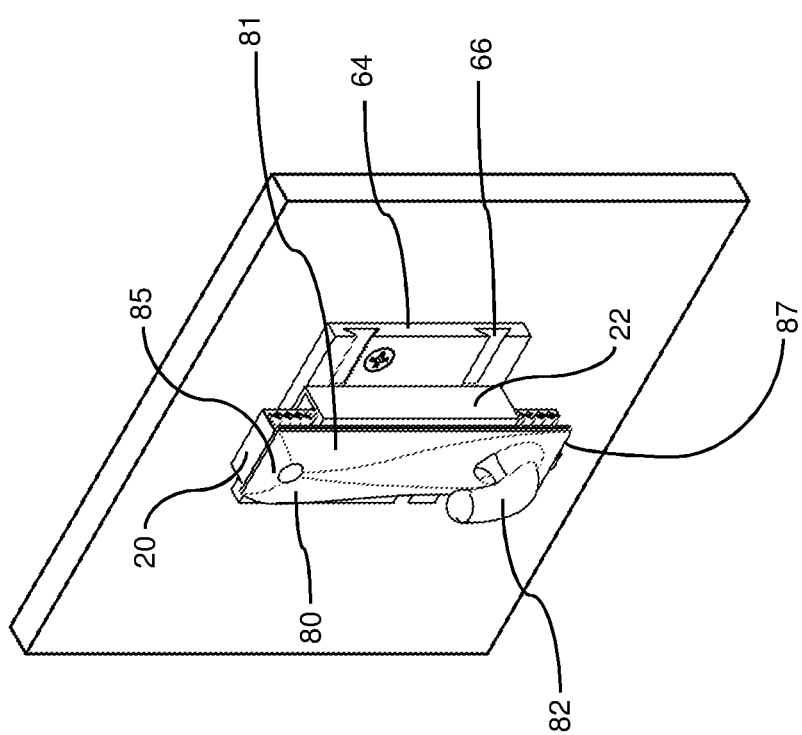
Figure 8D:
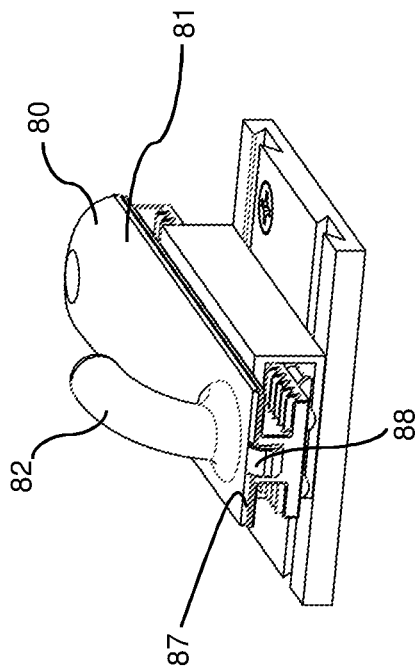
Figure 8E:
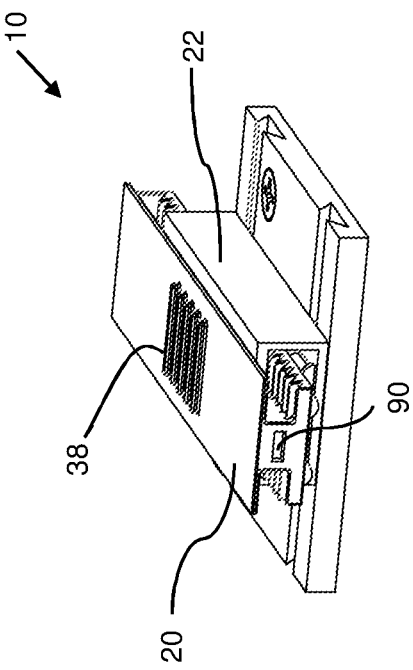

With reference to FIGS. 8A-8E, adjustable hanger assembly 10 can further comprise a hook plate 80 comprising an outer surface 81, an inner surface 83, a plate top end 85, and a plate bottom end 87. Outer surface 81 can comprise a hook 82. Plate bottom end 87 can comprise a clip 88. Inner surface 83 can comprise a first recess 84 for accommodating hanger 25 of slider 20. In some embodiments, outer surface 31 of slider front wall 30 further comprises one or more horizontally arranged ridges 38 protruding therefrom, for example, to assist in gripping and sliding slider 20, and inner surface 83 of hook plate 80 can comprise a second recess 86 for accommodating horizontally arranged ridges 38. Slider 20 can include a clip notch 90 as shown in FIG. 8E, for example, in plate bottom end 87, to accommodate clip 88 of hook plate 80.

Figure 8C:
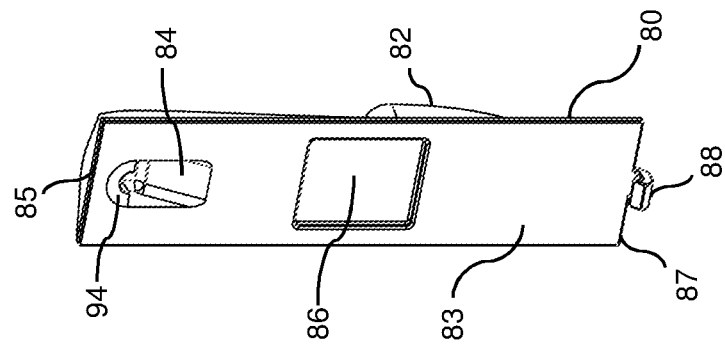

In some embodiments, slider 20 can be free of, that is, not include, a hanger, such as depicted in FIG. 8E. In such embodiments, hook plate inner surface 83 does not need to be provided with an opening, hole, or first recess to accommodate a hanger. As shown in FIG. 8C, however, first recess 84 for accommodating hanger 25 of a slider can include a catch edge 94 for catching the top edge of hanger 25. Together with clip 88 and clip notch 90, catch edge 94 can prevent hook plate 80 from dislodging from slider 20.

Figure 9B:
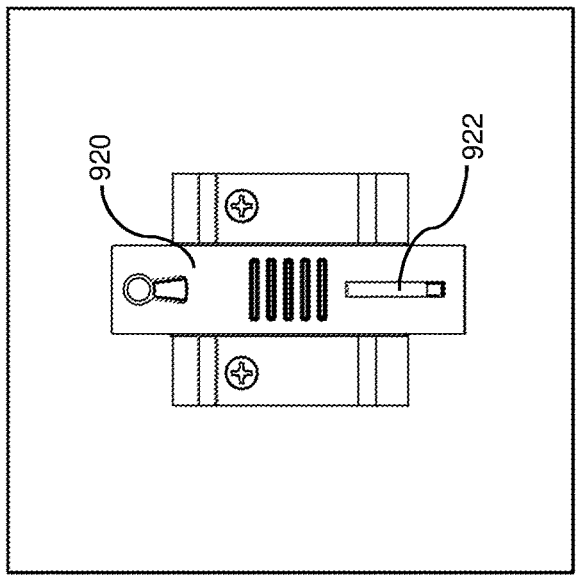
FIGS. 9A-9C depict various views of an adjustable hanger assembly according to various embodiments of the present invention, which include a pivotable post.
Figure 9C:
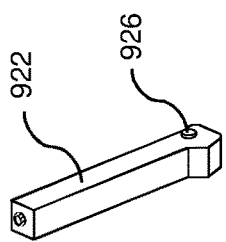
Figure 9A:
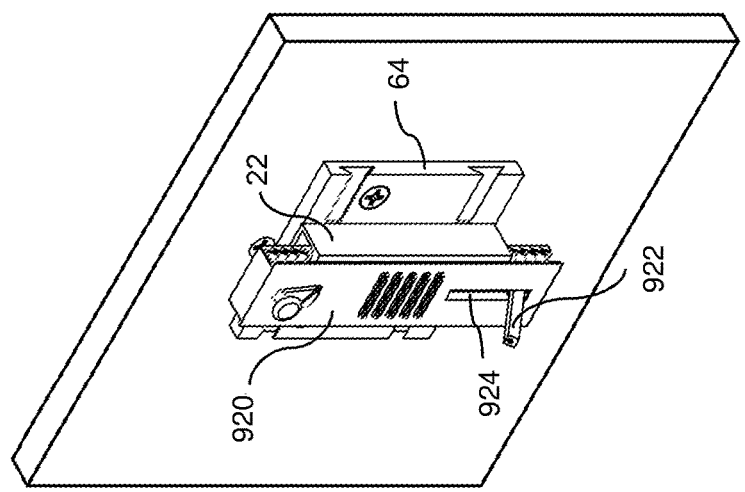

FIGS. 9A-9C show another embodiment of a slider 920 that includes a pivotable post 922 that can be pivoted to extend from the front face of slider 920, for example, at an upwardly extending angle. The angle can be any suitable upward angle such as one degree or more, five degrees or more, ten degrees or more, 89 degrees or less, 75 degrees or less, or within any suitable range, for example, from about 15 degrees to about 75 degrees, from about 30 degrees to about 60 degrees, or from about 40 degrees to about 50 degrees. The angle can be about or exactly 45 degrees. Pivotable post 922 can fold into a post recess 924 built into the front wall of slider 920. Pivotable post 922 can pivot about a pivot pin 926 and post recess 924 can be provided with a pivot pin recess (not shown) into which pivot pin 926 can be snapped or otherwise pivotably mounted.

Figure 10B:
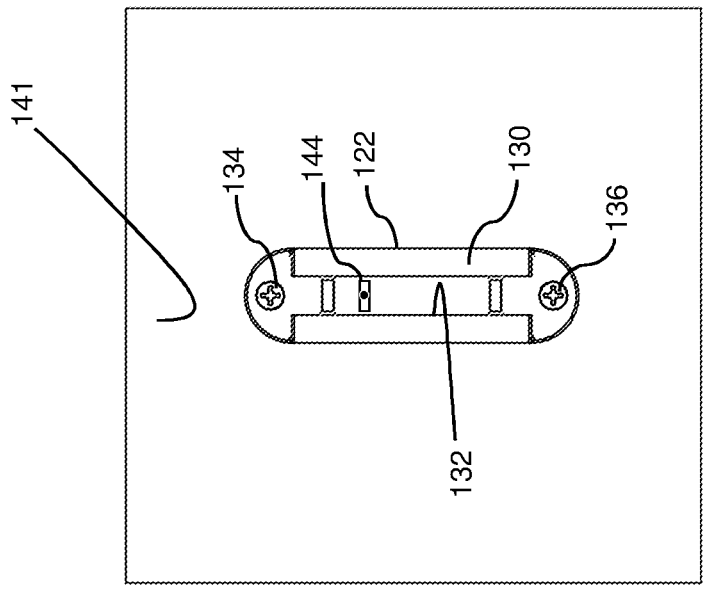
FIGS. 10A and 10B are a top, right-side, perspective view and a front view, respectively, of another slider base according to various embodiments of the present invention.
Figure 10A:
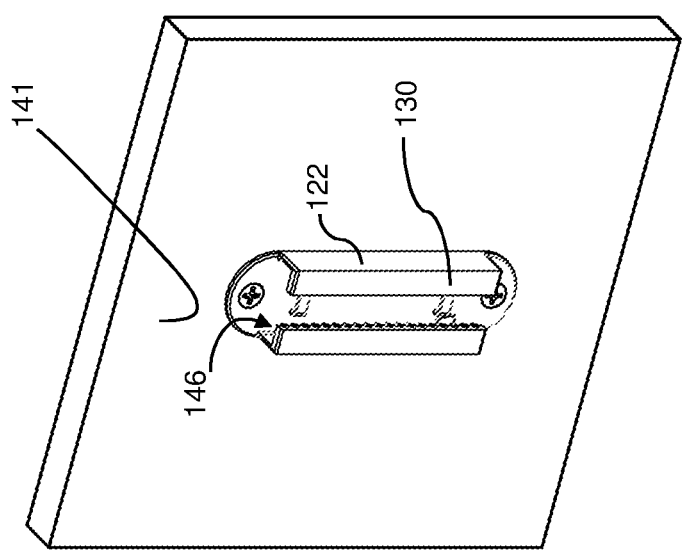

FIGS. 10A and 10B show another embodiment of a base slider 122 that can be screwed or otherwise mounted directly onto a wall. Screws 134 and 136 can be used to mount the base slider to a wall 141. Base slider 122 can be provided with through-holes through the back wall thereof to accommodate screws 134. Either or both of the through-holes and screws can be bevelled to provide a flush mounting. The spring has been removed from base slider 122 for the sake of simplicity, and to reveal a levelling feature 144 (FIG. 10B). Leveling feature 144 can comprise, for example, a level comprising an air bubble captured in a graduated liquid vessel. A hanging plumb line (not shown) can instead be attached to or otherwise provided with or on the slider base so that it can be mounted perfectly straight up-and-down.

Figure 11B:
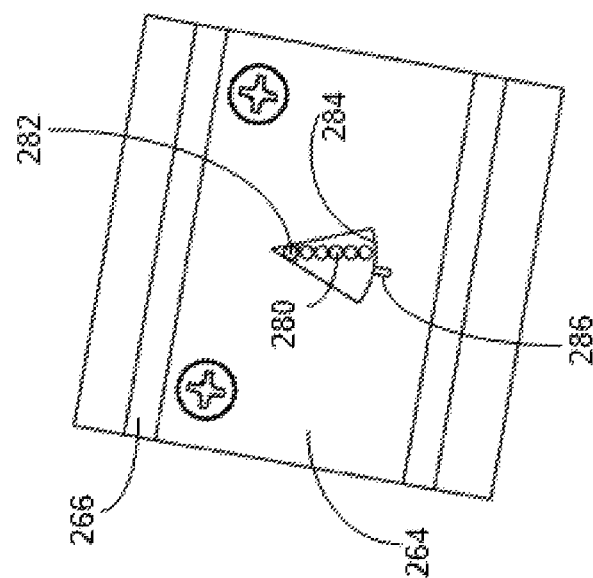
FIGS. 11A and 11B are front views of a mounting bracket with leveling feature, mounted correctly (FIG. 11A) and crooked (FIG. 11B).
Figure 11A:
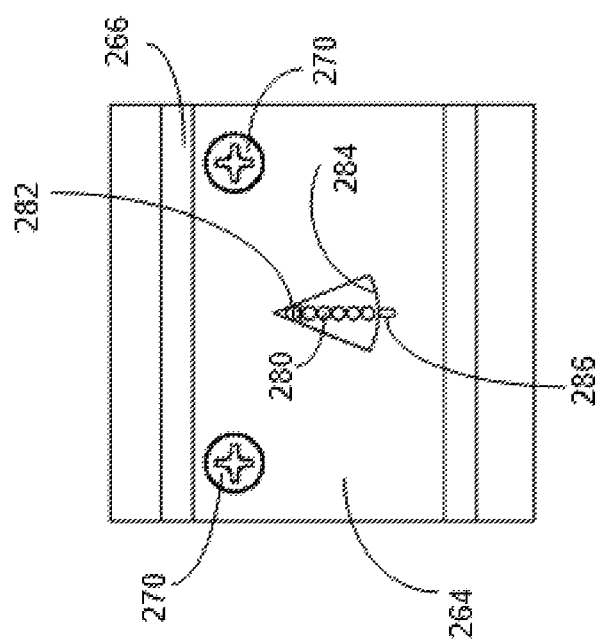

FIGS. 11A and 11B are front views of a mounting bracket 264, according to various embodiments of the present invention, that includes yet another leveling feature. Mounting bracket 264 has a recess or opening 284 and a dangling plumb line 280 in the form of a string of beads, such as hollow metal beads. Plumb line 280 can be secured at a top, first bead 282, to the top of recess 284 and can be of such a length as to dangle freely, unobstructed, within recess 284. Plumb line 280 can be lined-up with, i.e., aligned, with a level mark 286 that can comprise an etched groove, cut, indicia, or other marking to show where mounting bracket is vertically aligned. Lining up plumb line 280 with level mark 286 can be done for marking where bolt holes should be formed in a wall, to received mounting bolts 270. When aligned with level mark 286, as shown in FIG. 11A, it can be seen that a horizontal groove 266 is positioned horizontally. When plumb line 280 is not aligned with level mark 286, as shown in FIG. 11B, it can be seen that groove 266 and the entirety of mounting bracket 264 is crooked, i.e., not horizontal.

Other uses for the device and system of the present invention are also within the realm of the invention. The device can be used to cinch or tighten a line, wire, cable, cord, strap, or rope having one end connected to a fixed piece of hardware and the other end, or a mid-section thereof, connected to, wrapped around, or otherwise supported by the hanger. The device and system can also be used to take slack out of a line, wire, cable, cord, strap, or rope.

The present invention includes the following numbered aspects, embodiments, and features, in any order and/or in any combination:

1. An adjustable hanger assembly comprising:
a slider, a slider base, and a spring,
the slider comprising a top end, a bottom end, a front wall extending from the top end to the bottom end, a back wall extending from the top end to the bottom end, and a plurality of teeth, each of the teeth protruding from the back wall toward the front wall, extending downwardly at an angle, and terminating in a distal edge, the plurality of teeth being arranged adjacent one another such that the distal edges of the teeth are parallel to one another, and
the slider base comprising one or more fasteners for securing the spring, a base top end, a base bottom end, a groove for slidingly engaging the slider, a base front wall at least partially defining the groove, and at least one catch tooth protruding from the base front wall into the groove, the at least one catch tooth being angled upwardly toward the base top end, terminating in a distal catch end, and forming a catch groove between the distal catch end and the base front wall,
wherein the spring is fastened to the slider base by the fasteners, the slider is slidingly engaged in the groove of the slider base, the spring is configured to urge the plurality of teeth of the slider into engagement with the at least one catch tooth, the slider is configured to be biased by the spring, and the slider is configured to be pushed against the spring to deform the spring and enable the slider to move up and down in the groove so that different teeth of the plurality of teeth can engage the at least one catch tooth and the height of the slider can be adjusted with respect to the slider base.

2. The adjustable hanger assembly of any preceding or following embodiment/feature/aspect, wherein the slider base has a base back wall, the base back wall has an inner surface and an outer surface, the inner surface partially defines the groove, and the outer surface comprises one or more horizontal rails extending therefrom, and wherein the adjustable hanger assembly further comprises a mounting bracket configured to be fixedly secured to a wall and comprising one or more horizontal receiving grooves for receiving the one or more horizontal rails.

3. The adjustable hanger assembly of any preceding or following embodiment/feature/aspect, wherein at least one of the one or more horizontal rails has a trapezoidal cross-section.

4. The adjustable hanger assembly of any preceding or following embodiment/feature/aspect, wherein the mounting bracket comprises a recess formed therein, a dangling plumb line secured to the top of the recess, and a level mark that aligns with the plumb line when the mounting bracket is horizontally positioned.

5. The adjustable hanger assembly of any preceding or following embodiment/feature/aspect, wherein the slider front wall has an outer surface and a hanger formed on the outer surface.

6. The adjustable hanger assembly of any preceding or following embodiment/feature/aspect, wherein the hanger is in the form of a hook.

7. The adjustable hanger assembly of any preceding or following embodiment/feature/aspect, wherein the hanger is in the form of an at least partially round protrusion extending from the slider front wall and defining a hanger groove.

8. The adjustable hanger assembly of any preceding or following embodiment/feature/aspect, further comprising a hook plate, the hook plate comprising an outer surface, an inner surface, a plate top end, and a plate bottom end, the outer surface comprising a hook, the plate bottom end comprising a clip, and the inner surface comprising a first recess for accommodating the hanger.

9. The adjustable hanger assembly of any preceding or following embodiment/feature/aspect, wherein the outer surface of the slider front wall further comprises one or more horizontally arranged ridges protruding therefrom, and the hook plate inner surface further comprises a second recess for accommodating the one or more horizontally arranged ridges.

10. The adjustable hanger assembly of any preceding or following embodiment/feature/aspect, wherein the slider base has a top edge, the slider has a top edge, the slider is engaged in the slider base, the adjustable hanger assembly is mounted on a wall, and the top edge of the slider is above the top edge of the slider base.

11. The adjustable hanger assembly of any preceding or following embodiment/feature/aspect, wherein the slider base has a top edge, the mounting bracket has a top edge, the slider has a top edge, the slider is engaged in the slider base, the slider base is engaged in the mounting bracket, the adjustable hanger assembly including the mounting bracket is mounted on a wall, and the top edge of the slider is above the top edge of the slider base and above the top edge of the mounting bracket.

12. The adjustable hanger assembly of any preceding or following embodiment/feature/aspect, wherein the plurality of teeth of the slider comprises two columns of teeth, the slider further comprises a solid portion connecting the slider front wall and the slider back wall between the two columns of teeth, and the slider base front wall comprises a left portion and a right portion separated by a gap.

13. The adjustable hanger assembly of any preceding or following embodiment/feature/aspect, wherein the slider is engaged with the slider base.

14. The adjustable hanger assembly of any preceding or following embodiment/feature/aspect, wherein the slider is engaged with the slider base and the slider base is engaged with the mounting bracket.

15. The adjustable hanger assembly of any preceding or following embodiment/feature/aspect, wherein the slider is engaged with the slider base.

16. The adjustable hanger assembly of any preceding or following embodiment/feature/aspect, wherein the spring comprises a leaf spring.

17. The adjustable hanger assembly of any preceding embodiment/feature/aspect, wherein the slider and the slider base comprise plastic material and the spring comprises a metal material.

18. A method, comprising:
mounting a slider base on a wall, the slider base comprising a base top end, a base bottom end, a groove for slidingly engaging a slider, a spring, one or more fasteners for securing the spring, a base front wall at least partially defining the groove, and at least one catch tooth protruding from the base front wall into the groove, the at least one catch tooth being angled upwardly toward the base top end, terminating in a distal catch end, and forming a catch groove between the distal catch end and the base front wall; and engaging a slider with the slider base, the slider comprising a top end, a bottom end, a front wall extending from the top end to the bottom end, a back wall extending from the top end to the bottom end, and a plurality of teeth, each of the teeth protruding from the back wall toward the front wall, extending downwardly at an angle, and terminating in a distal edge, the plurality of teeth being arranged adjacent one another such that the distal edges of the teeth are parallel to one another, wherein the slider is slidingly engaged in the groove of the slider base, the spring urges the plurality of teeth of the slider into engagement with the at least one catch tooth, the slider is biased by the spring, and the slider is configured to be pushed against the spring to deform the spring and enable the slider to move up and down in the groove so that different teeth of the plurality of teeth can engage the at least one catch tooth and the height of the slider can be adjusted with respect to the slider base.

19. The method of any preceding or following embodiment/feature/aspect, wherein the mounting the slider base comprises:
mounting a mounting bracket to the wall; and
engaging the slider base with the mounting bracket.

20. The method of any preceding embodiment/feature/aspect, wherein the slider base comprises a base back wall, the base back wall has an inner surface and an outer surface, the inner surface partially defines the groove, and the outer surface comprises one or more horizontal rails extending therefrom, the mounting bracket comprises one or more horizontal receiving grooves for receiving the one or more horizontal rails, and the mounting comprises sliding the one or more horizontal rails into the one or more horizontal receiving grooves.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An adjustable hanger assembly comprising:
a slider, a slider base, a spring, and a mounting bracket,
the slider comprising a top end, a bottom end, a front wall extending from the top end to the bottom end, a back wall extending from the top end to the bottom end, and a plurality of teeth, each of the teeth protruding from the back wall toward the front wall, extending downwardly at an angle, and terminating in a distal edge, the plurality of teeth being arranged adjacent one another such that the distal edges of the teeth are parallel to one another,
the slider base comprising one or more fasteners for securing the spring, a base top end, a base bottom end, a groove for slidingly engaging the slider, a base front wall at least partially defining the groove, a base back wall, and at least one catch tooth protruding from the base front wall into the groove, the at least one catch tooth being angled upwardly toward the base top end, terminating in a distal catch end, and forming a catch groove between the distal catch end and the base front wall, the base back wall having an inner surface and an outer surface, the inner surface partially defining the groove, and the outer surface comprising one or more horizontal rails extending therefrom, and
the mounting bracket being configured to be fixedly secured to a wall and comprising one or more horizontal receiving grooves for receiving the one or more horizontal rails,
wherein the spring is fastened to the slider base by the fasteners, the slider is slidingly engaged in the groove of the slider base, the spring is configured to urge the plurality of teeth of the slider into engagement with the at least one catch tooth, the slider teeth and the at least one catch tooth are configured such that gravity forces the slider teeth into engagement with the at least one catch tooth, the slider is configured to be biased by the spring, the slider is configured to be pushed against the spring to deform the spring and enable the slider to move up and down in the groove so that different teeth of the plurality of teeth can engage the at least one catch tooth and the height of the slider can be adjusted with respect to the slider base, at least one of the horizontal rails and at least one of the horizontal receiving grooves are provided with notches, ridges, or bumps so that a specific horizontal orientation can be achieved and maintained, the slider base has a top edge, the mounting bracket has a top edge, the slider has a top edge, the slider is engaged in the slider base, the slider base is engaged in the mounting bracket, the adjustable hanger assembly including the mounting bracket is mounted on a wall, and the top edge of the slider is above the top edge of the slider base and above the top edge of the mounting bracket.

2. The adjustable hanger assembly of claim 1, wherein at least one of the one or more horizontal rails has a trapezoidal cross-section.

3. An adjustable hanger assembly comprising:
a slider, a slider base, and a spring,
the slider comprising a top end, a bottom end, a front wall extending from the top end to the bottom end, a back wall extending from the top end to the bottom end, and a plurality of teeth, each of the teeth protruding from the back wall toward the front wall, extending downwardly at an angle, and terminating in a distal edge, the plurality of teeth being arranged adjacent one another such that the distal edges of the teeth are parallel to one another, and the slider base comprising one or more fasteners for securing the spring, a base top end, a base bottom end, a groove for slidingly engaging the slider, a base front wall at least partially defining the groove, and at least one catch tooth protruding from the base front wall into the groove, the at least one catch tooth being angled upwardly toward the base top end, terminating in a distal catch end, and forming a catch groove between the distal catch end and the base front wall, wherein the spring is fastened to the slider base by the fasteners, the slider is slidingly engaged in the groove of the slider base, the spring is configured to urge the plurality of teeth of the slider into engagement with the at least one catch tooth, the slider is configured to be biased by the spring, and the slider is configured to be pushed against the spring to deform the spring and enable the slider to move up and down in the groove so that different teeth of the plurality of teeth can engage the at least one catch tooth and the height of the slider can be adjusted with respect to the slider base, wherein the slider base has a base back wall, the base back wall has an inner surface and an outer surface, the inner surface partially defines the groove, and the outer surface comprises one or more horizontal rails extending therefrom, the adjustable hanger assembly further comprises a mounting bracket configured to be fixedly secured to a wall and comprising one or more horizontal receiving grooves for receiving the one or more horizontal rails, and the mounting bracket comprises a recess formed therein, a dangling plumb line secured in the recess, adjacent to a top of the recess, and a level mark that aligns with the plumb line when the mounting bracket is horizontally positioned.

4. The adjustable hanger assembly of claim 1, wherein the slider is engaged with the slider base and the slider base is engaged with the mounting bracket.

5. The adjustable hanger assembly of claim 1, wherein the slider front wall has an outer surface and a hanger formed on the outer surface.

6. The adjustable hanger assembly of claim 5, wherein the hanger is in the form of a hook.

7. The adjustable hanger assembly of claim 5, wherein the hanger is in the form of an at least partially round protrusion extending from the slider front wall and defining a hanger groove.

8. An adjustable hanger assembly comprising:

a slider, a slider base, a spring, and a hook plate, the slider comprising a top end, a bottom end, a front wall extending from the top end to the bottom end, a back wall extending from the top end to the bottom end, and a plurality of teeth, each of the teeth protruding from the back wall toward the front wall, extending downwardly at an angle, and terminating in a distal edge, the plurality of teeth being arranged adjacent one another such that the distal edges of the teeth are parallel to one another, wherein the front wall has an outer surface and a hanger formed on the outer surface, the hanger comprising an at least partially round protrusion extending from the slider front wall and defining a hanger groove, and the slider base comprising one or more fasteners for securing the spring, a base top end, a base bottom end, a groove for slidingly engaging the slider, a base front wall at least partially defining the groove, a base back wall, and at least one catch tooth protruding from the base front wall into the groove, the at least one catch tooth being angled upwardly toward the base top end, terminating in a distal catch end, and forming a catch groove between the distal catch end and the base front wall, wherein the spring is fastened to the slider base by the fasteners, the slider is slidingly engaged in the groove of the slider base, the spring is configured to urge the plurality of teeth of the slider into engagement with the at least one catch tooth, the slider teeth and the at least one catch tooth are configured such that gravity forces the slider teeth into engagement with the at least one catch tooth, the slider is configured to be biased by the spring, the slider is configured to be pushed against the spring to deform the spring and enable the slider to move up and down in the groove so that different teeth of the plurality of teeth can engage the at least one catch tooth and the height of the slider can be adjusted with respect to the slider base, and the hook plate comprises an outer surface, an inner surface, a plate top end, and a plate bottom end, the outer surface comprising a hook, the plate bottom end comprising a clip, and the inner surface comprising a first recess for accommodating the hanger.

9. The adjustable hanger assembly of claim 8, wherein the outer surface of the slider front wall further comprises one or more horizontally arranged ridges protruding therefrom, and the hook plate inner surface further comprises a second recess for accommodating the one or more horizontally arranged ridges.

10. The adjustable hanger assembly of claim 8, wherein the slider base has a top edge, the slider has a top edge, the slider is engaged in the slider base, the adjustable hanger assembly is mounted on a wall, and the top edge of the slider is above the top edge of the slider base.

11. The adjustable hanger assembly of claim 1, wherein the plurality of teeth of the slider comprises two columns of teeth, the slider further comprises a solid portion connecting the slider front wall and the slider back wall between the two columns of teeth, and the slider base front wall comprises a left portion and a right portion separated by a gap.

12. The adjustable hanger assembly of claim 1, wherein the spring comprises a leaf spring.

13. The adjustable hanger assembly of claim 1, wherein the slider and the slider base comprise plastic material and the spring comprises a metal material.

\* \* \* \* \*